US009571283B2

(12) United States Patent
Chopra

(10) Patent No.: US 9,571,283 B2
(45) Date of Patent: *Feb. 14, 2017

(54) ENABLING PACKET HANDLING INFORMATION IN THE CLEAR FOR MACSEC PROTECTED FRAMES

(71) Applicant: Cisco Technology, Inc., San Jose, CA (US)

(72) Inventor: Rakesh Chopra, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/594,477

(22) Filed: Jan. 12, 2015

(65) Prior Publication Data

US 2015/0131798 A1    May 14, 2015

Related U.S. Application Data

(63) Continuation of application No. 13/253,329, filed on Oct. 5, 2011, now Pat. No. 8,966,240.

(51) Int. Cl.
*H04L 29/06* (2006.01)
*H04L 9/32* (2006.01)
(Continued)

(52) U.S. Cl.
CPC ............... *H04L 9/32* (2013.01); *H04L 12/462* (2013.01); *H04L 12/4645* (2013.01);
(Continued)

(58) Field of Classification Search
CPC .. H04L 63/0428; H04L 63/0485; H04L 63/08; H04L 63/162
(Continued)

(56) References Cited

U.S. PATENT DOCUMENTS 6,795,917 B1 *  9/2004  Ylonen ..................... 713/160
8,370,921 B2 *  2/2013  Duan .................. H04L 12/4633
                                                          713/160
(Continued)

OTHER PUBLICATIONS

Yaser Pourmohammadi Fallah ei al., A Controlled-Access Scheduling Mechanism for QoS Provisioning in IEEE 802.11e Wireless LANs, Oct. 2005, ACM, pp. 122-129.*
(Continued)

*Primary Examiner* — Kari Schmidt
*Assistant Examiner* — Fahimeh Mohammadi
(74) *Attorney, Agent, or Firm* — Edell, Shapiro & Finnan, LLC

(57) ABSTRACT

Techniques are provided to append packet handling information "in the clear" ahead of security related information in a packet to be routed over a network to optimize wide area network deployments of security-configured equipment. In one form, at a network device that performs connectionless secure communication and network routing of packets, data is received from a source device to be sent through a network to a destination device. Packet handling information is inserted in a packet that is to be used to transport the data. The packet handling information is configured to enable controlled handling of the packet in the network and is inserted in an unprotected portion of the packet. Encrypted payload data is generated from the data received from the source device. The encrypted payload data and security information are inserted in a protected portion of the packet and the packet is sent to the network.

20 Claims, 6 Drawing Sheets

(51) Int. Cl.
*H04L 12/723* (2013.01)
*H04L 12/46* (2006.01)
*H04W 12/08* (2009.01)

(52) U.S. Cl.
CPC ............ *H04L 45/50* (2013.01); *H04L 63/162* (2013.01); *H04W 12/08* (2013.01); *H04L 12/4641* (2013.01); *H04L 63/0428* (2013.01); *H04L 63/08* (2013.01); *H04L 2209/80* (2013.01)

(58) Field of Classification Search
USPC .................. 713/150, 151, 160; 370/389, 392
See application file for complete search history.

(56) References Cited

U.S. PATENT DOCUMENTS

| | | | | |
|---|---|---|---|---|
| 8,707,020 | B1* | 4/2014 | Lengyel | H04L 63/0428 370/252 |
| 2003/0108038 | A1* | 6/2003 | Devanagondi | H04L 49/90 370/389 |
| 2004/0143734 | A1* | 7/2004 | Buer | H04L 63/0428 713/153 |
| 2006/0182127 | A1 | 8/2006 | Park | |
| 2006/0191002 | A1 | 8/2006 | Lee et al. | |
| 2007/0133528 | A1* | 6/2007 | Jin | H04B 7/18593 370/389 |
| 2007/0147378 | A1* | 6/2007 | Elgebaly | H04L 63/0272 370/392 |
| 2007/0223456 | A1* | 9/2007 | Maruyama | H04L 12/66 370/352 |
| 2008/0123652 | A1* | 5/2008 | Akyol | H04L 12/4633 370/392 |
| 2008/0126559 | A1* | 5/2008 | Elzur | H04L 63/0464 709/232 |
| 2009/0307751 | A1* | 12/2009 | Lin et al. | 726/3 |
| 2010/0153701 | A1* | 6/2010 | Shenoy et al. | 713/151 |
| 2010/0228974 | A1 | 9/2010 | Watts et al. | |
| 2010/0229013 | A1* | 9/2010 | Diab | H04L 63/16 713/323 |
| 2011/0078783 | A1* | 3/2011 | Duan | H04L 12/4633 726/15 |
| 2011/0087878 | A1* | 4/2011 | Weis | H04L 63/102 713/151 |
| 2011/0119740 | A1* | 5/2011 | Grayson | H04L 12/4641 726/5 |
| 2011/0128975 | A1* | 6/2011 | Kang et al. | 370/477 |
| 2011/0261812 | A1 | 10/2011 | Kini et al. | |

OTHER PUBLICATIONS

Yuichi Harada et al., Cross-Layer Approach for Supporting QoS in IEEE802.11 DCF Wireless LANs, Oct. 2010, ACM, pp. 1-10.*
Jun-Won Lee et al., Design of Secure ARP on MACsec(802.1AE), Dec. 16-18, 2010, IEEE, pp. 1-4.*
A.Rajaram et al., The Trust-Based MAC—Layer Security Protocol for Mobile Ad hoc Networks, Sep. 23-25, 2010, IEEE, pp. 1-4.*
International Search Report and Written Opinion in International Application No. PCT/US2012/049110, mailed Nov. 15, 2012.
Brian Weis, Security consideration and proposal for MACsec key establishment, May 15, 2006, IEEE, pp. 1-18.
Hayriye Altunbasak et al., Security Inter-layering for Evolving and Future Network Architectures, Mar. 22-25, 2007, IEEE, pp. 615-620.
IEEE Standard for Local and metropolitan area networks Media Access Control (MAC) Security, Aug. 2006, IEEE, pp. 1-154.
Jun-Won Lee et al., Design for Secure ARP on MACsec (802.1 AE), Dec. 16-18, 2010, pp. 1-4.

* cited by examiner

ENABLING PACKET HANDLING INFORMATION IN THE CLEAR FOR MACSEC PROTECTED FRAMES

CROSS-REFERENCE TO RELATED APPLICATION

This application is a continuation of U.S. application Ser. No. 13/253,329, filed Oct. 5, 2011 (status pending), the entirety of which is incorporated herein by reference.

TECHNICAL FIELD

The present disclosure relates to communication networks.

BACKGROUND

MACSEC, defined in the IEEE 802.1AE standard, is a connectionless secure communication protocol that was initially defined for point-to-point security between two devices. Over time usage of MACSEC has been extended to provide end-to-end encryption across a third party network using tunnels, bridges, and labels. Today, to transport MACSEC packets across third party networks requires at least two devices or boxes. The first box encrypts the packet with and the second box tunnels the packet through the network.

The security information is inserted in the packet immediately following the destination address/source address (DA/SA) fields, and all of the lower level packet information is hidden from the network that is forwarding the packets.

DESCRIPTION OF EXAMPLE EMBODIMENTS

Overview

Techniques are provided to append packet handling information "in the clear" ahead of security related information in a packet to be sent over a security-unaware Layer 2 network to optimize wide area network deployments. In one form, at a network device that performs connectionless secure communication and network routing of packets in a network, data is received from a source device to be sent through the network to a destination device. Packet handling information is inserted in a packet that is to be used to transport the data. The packet handling information is configured to enable controlled handling of the packet in the network and is inserted in an unprotected portion of the packet in a standards compliant manner. Encrypted payload data is generated from the data received from the source device. The encrypted payload data and security information are inserted in protected portion of the packet and the packet is sent to the network.

Example Embodiments

Figure 1:
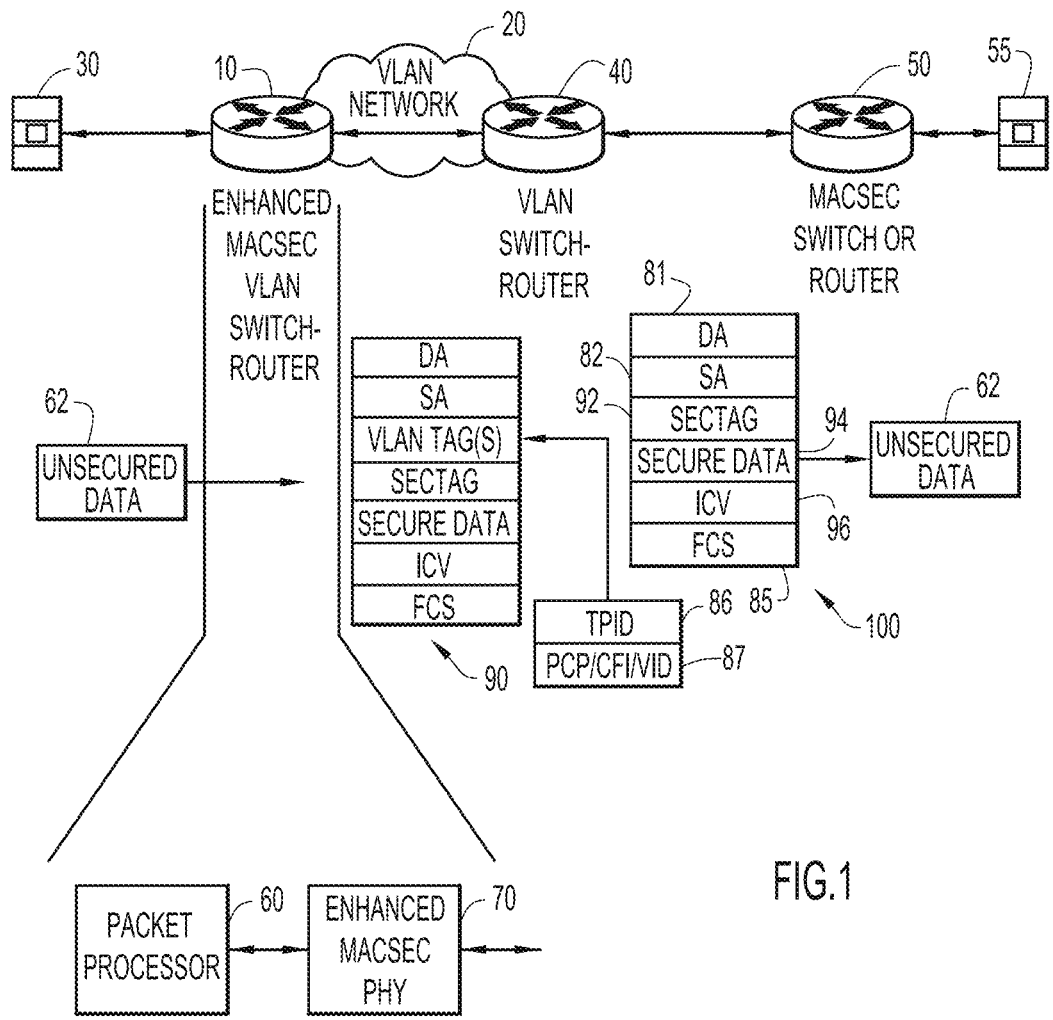
FIG. 1 is a block diagram illustrating a network environment in which a MACSEC virtual local area network (VLAN) switch-router is deployed to add packet handling information to MACSEC packets to be sent over a VLAN.
Figure 1:
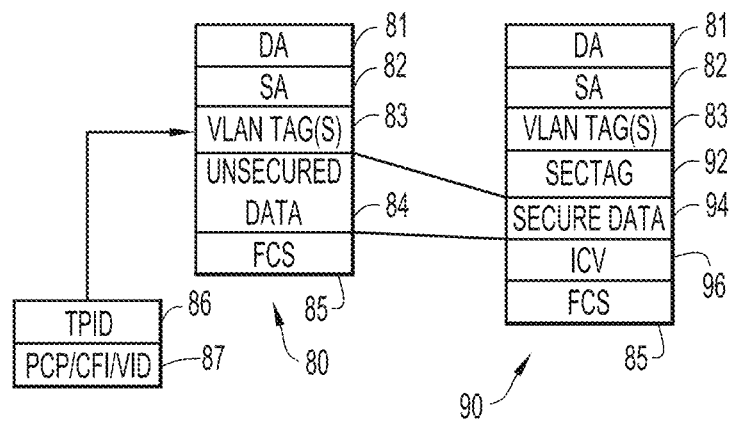

Referring first to FIG. 1, a network environment is shown comprising an enhanced MACSEC VLAN switch-router 10 that is used to communicate between a network, e.g., VLAN 20, and end station 30. "MACSEC" refers to the IEEE MAC Security standard (known by the designation IEEE 802.1AE) that defines connectionless data confidentiality and integrity for media access independent protocols. A MACSEC connection, as defined by IEEE 802.1AE, is a point-to-point connection. In this sense, it is referred to as a "connectionless" protocol. The MACSEC standard does not specify launching a VLAN tag from the encrypting device itself to allow switching/steering information to be populated based on the unencrypted data. The enhanced MACSEC VLAN switch-router 10 is an example of a network device that performs connectionless secure communication and network routing of packets in a network.

A VLAN is a group of hosts with a common set of requirements that communicate as if they were attached to the same broadcast domain, regardless of their physical location. A VLAN has the same attributes as a physical local area network (LAN), but it allows for end stations to be grouped together even if they are not located on the same network switch. The VLAN 20 may be connected to or part of a wide area network (WAN) which, for simplicity, is not shown in FIG. 1.

VLAN tag information inserted into packets is used to route the packets in the VLAN 20. The VLAN tag information is removed from the packet before it is sent to the far end MACSEC switch or router 50 by the final device in the provider network 40. When MACSEC packets are sent over a VLAN, the packets are encrypted and the VLAN 20 will treat all the MACSEC packets the same for purposes of priority QoS routing, etc.

According to the techniques disclosed herein, the enhanced MACSEC VLAN switch-router 10 is a network device that integrates into a single box or device MACSEC communication functions and VLAN switch-router functions. In so doing, the enhanced MACSEC VLAN switch-router 10 is able to add network intelligence information into packets that are sent into the VLAN 20 for use in controlled handling of the packet by other equipment in the VLAN 20, e.g., VLAN switch-router 40. In one example, a conventional MACSEC switch-router 50 may be deployed on the other side of the VLAN 20, which in turn is connected to end station 55. It is also possible to combine the conventional VLAN switch-router 40 and MACSEC switch-router 50 into a device with equivalent functionality of enhanced MACSEC VLAN switch router 10.

The enhanced MACSEC VLAN switch-router 10 adds network intelligence, called "packet handling information" herein, that is useful for handling of the packet in the VLAN 20. The packet handling information is generated from the unencrypted/unsecured data to be transported, but is included in the packet transported across the network as if it was added by the network service provider equipment. There are several forms of packet handling information that are described below. The packet handling information allows intermediate network equipment in the VLAN to perform controlled handling of the packet to steer, priority-base route and/or perform other functions (e.g., billing) related to the packet without being aware of the MACSEC characteristics of the packet. As a result, the VLAN equipment can take advantage of the packet handling information without the need for any changes in its hardware or software.

As shown in FIG. 1, the enhanced MACSEC VLAN switch-router generally includes a packet processor 60 and an enhanced MACSEC physical (PHY) component 70. A more detailed block diagram of the MACSEC physical (PHY) component 70 is described hereinafter in connection with FIG. 3. The packet processor 60 evaluates the unsecured data and generates packet handling information that is inserted into an appropriate field of a packet. In general, the packet handling information is any data to be put "in the clear" before security information that is useful for handling of the packet in the network in which it is transported.

In one form, the packet handling information includes one or more VLAN tags in accordance with IEEE 802.1Q and in another form the packet handling information includes one or more Multiprotocol Label Service (MPLS) labels. For example, a VLAN identifier (VID) or a MPLS label can be used to dictate/determine specific routes through a service provider network and/or to denote unique billing/handling instructions to the service provider for different types of traffic. As described further hereinafter, within a VLAN tag and within a MPLS label, there are fields that allow for insertion of routing priority information that can be assigned based on the unencrypted data. In yet another example, packet handling information can be used to enable MACSEC across a pseudowire connection instead of a VLAN/MPLS service provider network. Pseudowire (or pseudo-wire) is an emulation of a Layer 2 point-to-point connection-oriented service over a packet-switching network (PSN). Thus, the techniques described herein can be used to allow MACSEC to be added to pseudowire emulation edge-to-edge working group (PWE3) connections that exist between two end points which cannot offer MACSEC.

The packet processor 60 receives unsecured data 62 from end station 30 and generates VLAN packet 80 comprising fields for a destination address (DA) 81, a source address (SA) 82, VLAN tag(s) 83, the unsecured data 84, and frame check sequence (FCS) 85. In the first form, the packet processor 60 populates the VLAN tag(s) field 83 to encode packet handling information of the packet 80, including information describing a level of the service to be used for the unsecured data. For example, the packet processor 60 evaluates the unsecured data and based thereon, fills in a value for a Tag Protocol Identifier (TPID) 86 which is a 16-bit field set to a particular value (e.g., 0x8100) in order to identify the frame as an IEEE 802.1Q-tagged frame. This field is located at the same position as the EtherType/Length field in untagged frames, and is thus used to distinguish the frame from untagged frames. In addition, the packet processor 60 fills in a value in field 87 for a Priority Code Point (PCP) which is a 3-bit field that refers to the IEEE 802.1p priority. The PCP indicates the packet priority level. PCP values are from 0 (best effort) to 7 (highest effort); 1 represents the lowest priority. These values can be used to prioritize different classes of traffic (voice, video, data, etc.) to achieve desired QoS handling of packets. The packet processor 60 generates or selects a PCP value based on the type of unsecured data to be transmitted. Also inserted into field 87 is a Canonical Format Indicator (CFI) which is a 1-bit value. If the value of CFI is 1, the MAC address is in non-canonical format. If the value is 0, the MAC address is in canonical format. It is always set to zero for Ethernet switches. CFI is used for compatibility between Ethernet and Token Ring networks. If a frame received at an Ethernet port has a CFI set to 1, then that frame should not be bridged to an untagged port. The VLAN Identifier (VID) is a 12-bit value that specifies the VLAN to which the frame/packet belongs. The hexadecimal values of 0x000 and 0xFFF are reserved. All other values may be used as VLAN identifiers, allowing up to 4094 VLANs. The reserved value 0x000 indicates that the frame does not belong to any VLAN; in this case, the 802.1Q tag specifies only a priority and is referred to as a priority tag.

For example, if the packet handling information takes the form of VLAN tag(s), the priority bits (e.g., PCP bits 86 according to IEEE 802.1p) can be set appropriately by the enhanced MACSEC VLAN switch-router when the packet is transmitted into the VLAN 20. The equipment in the VLAN 20 can then act on the 802.1p bits appropriately, unaware of MACSEC encryption of the real data payload. Unique packet intelligence information (VLAN tags or MPLS labels) can be used to instruct the network to treat the packets differently.

The MACSEC PHY component 70 receives the packet 80 and generates a new packet 90 by parsing down past the DA/SA fields 81 and 82 and the VLAN tag(s) field 83 with variable/configurable masks to insert MACSEC Security Tag (SecTag) information in field 92, secure data in field 94 and an Integrity Check Value (ICV) in field 96 after the VLAN tag(s) field 83 before the FCS field 85. Thus, instead of inserting the SecTag directly after the SA field 82, in one form, the MACSEC PHY processor component 70 parses down past the packet handling information, e.g., one or more VLAN tags, and then inserts the encrypted payload (Secure-Data) and SecTag. This leaves the packet handling information (embodied in the VLAN tag(s)) or MPLS labels totally in the clear. As described further hereinafter, VLAN tags can still be inserted passed the SecTag as well to allow for sensitive VLAN information to remain encrypted.

Fundamentally the payload structure of packet 90 which departs the enhanced MACSEC VLAN switch-router 10 appears identical as a packet that would be sent by a standard MACSEC device and having packet handling information (VLANs or MPLS tags) appended by another device. However because the encryption and the packet handling information (e.g., tags or labels) appended to the packet are done within the same device (the enhanced MACSEC VLAN switch-router 10), the MACSEC VLAN switch-router 10 can add intelligence in the form of the packet handling information to the labels and tags which are being appended. Moreover, because the final packet, packet 90, that is sent by the MACSEC VLAN switch-router 10 is fully equivalent to the packet that would be sent if the MACSEC and VLAN functions were performed by two separate boxes/devices, any device downstream that receives the packet 90 can remain unchanged in terms of its hardware and software to properly handle and route the packet. For example, the VLAN switch router 40 (and any other intervening VLAN switch routers, not shown in FIG. 1 for simplicity) will process and route the packet 90, and ultimately the MACSEC switch or router 50 recovers the MACSEC packet 100 comprising fields for the DA 81, SA 82, SecTag 92, Secure-Data 94, ICV 96 and FCS 85. The MACSEC switch-router 50 decrypts the SecureData 94 to obtain the unsecured data 62 for delivery to the end station 55. If another enhanced MACSEC VLAN switch-router 10 is deployed, bi-directional QoS improvements may be achieved. However, the use of a single enhanced MACSEC VLAN switch-router 10 can provide improvement for packets sent in one direction.

This aforementioned functionality can be implemented in one or more integrated circuit chips used to implement the functions of the packet processor 60 and MAC PHY processor component 70, and the full set of headers can be created by other components, e.g., software executed by a processor. The MAC PHY component 70 parses passed the headers 81 and 82 and inserts the SecTag 92 in the appropriate location in the egress path. Upon receiving packet 90 in the ingress path, the MAC PHY processor component 70 parses passed the headers to locate the SecTag 92 and performs the appropriate SA lookup. However, the techniques described herein are not limited to implementation within a PHY or MAC, and can also be implemented completely or partially in software executed by a processor.

Figure 2:
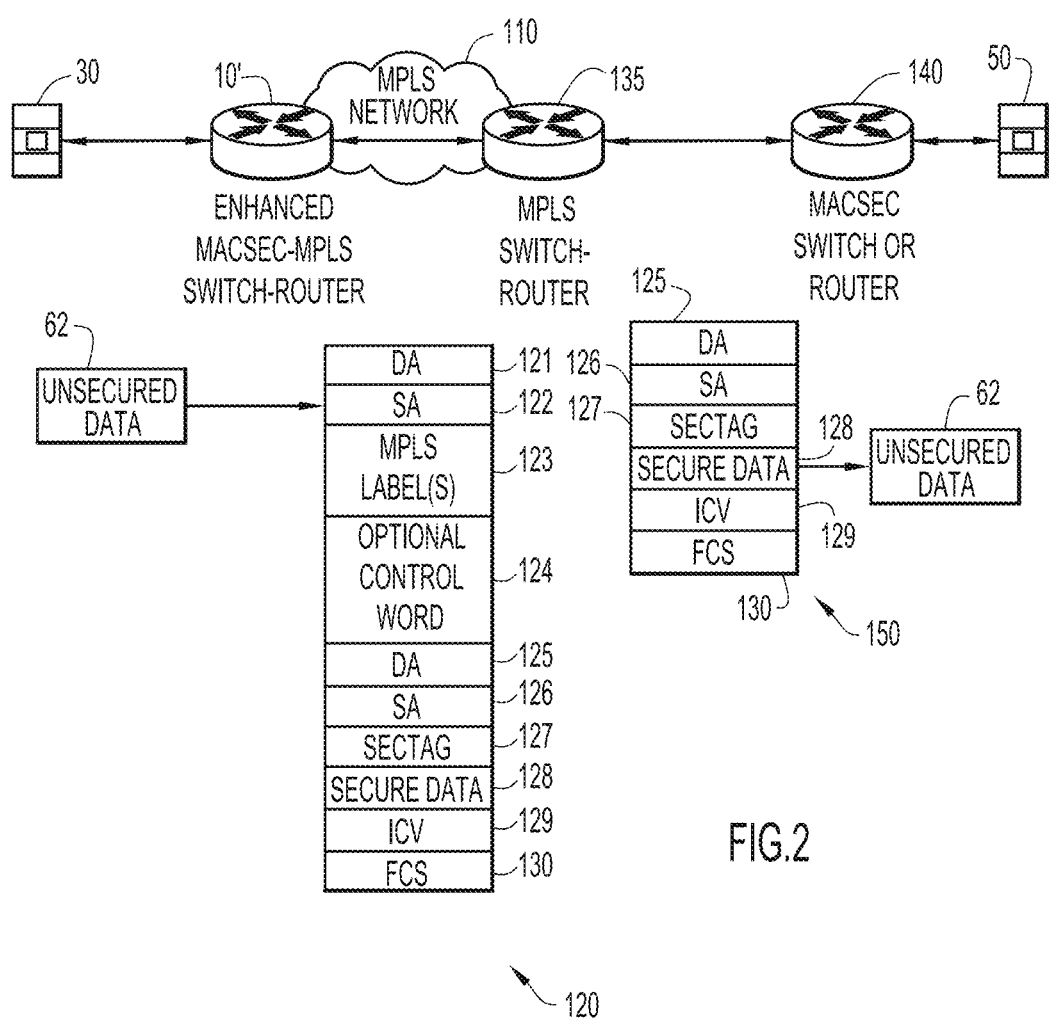
FIG. 2 is a block diagram illustrating a network environment in which a MACSEC Multiprotocol Label Switching (MPLS) switch-router is deployed to add packet handling information to MACSEC packets to be sent over a MPLS network.

Turning now to FIG. 2, an application of an enhanced MACSEC MPLS switch-router 10' is shown in a Layer 2 (L2) MPLS network environment 7. The enhanced MACSEC MPLS switch-router 10' is similar to the enhanced MACSEC VLAN switch-router 10 except that it is configured to route packets according MPLS techniques in a MPLS network 110. The enhanced MACSEC MPLS switch-router 10' receives unsecured data 62 from end station 30 and generates a packet 120 configured for MPLS routing in the MPLS network 110.

The MPLS packet 120 comprises fields for the MPLS DA 121, MPLS SA 122, MPLS Label(s) 123, optional control word 124, followed by the MACSEC DA 125, MACSEC SA 126, SecTag 127, SecureData 128, ICV 129 and FCS 130. The MPLS Label(s) 123 include(s) packet handling information useful for packet steering, priority-based routing or to denote billing/handling instructions by equipment in the MPLS network 110. MPLS routing involves assigning MPLS labels that are used for packet-forwarding decisions, without the need to examine the payload/data in the packet. The control word is an optional field that can provide additional information about the type of payload being carried over MPLS. For example, the control word also can include information such as sequence numbers to allow a flow to be re-ordered at the destination if the data being transported requires in order delivery.

MPLS routing operates by prefixing packets with an MPLS header, containing one or more MPLS labels, also known as a label stack. Each label stack entry contains four fields:

1. A 20-bit label value.
2. A 3-bit Traffic Class field for QoS priority Explicit Congestion Notification (ECN).
3. A 1-bit bottom of stack flag. If this is set, it signifies that the current label is the last in the stack.
4. An 8-bit Time-to-Live (TTL) field.

When an MPLS switch-router, e.g., MPLS switch router 135, receives MPLS-labeled packets, it performs a label lookup/switch instead of a lookup into an Internet Protocol (IP) table.

After routing in the MPLS network 110, the MACSEC switch or router 140 will obtain the MACSEC packet 150 that contains the comprising fields for the MACSEC DA 125, MACSEC SA 126, SecTag 127, SecureData 128, ICV 129 and FCS 130. The MACSEC switch or router 140 decrypts the SecureData 94 to recover the unsecured data 62. If MPLS switch-router 135 and MACSEC switch or router 140 are combined into a single device (thus forming another enhanced MACSEC MPLS switch-router like 10') the enhanced MACSEC MPLS switch-router would receive packet 120 and parse past one or more MPLS labels to the MACSEC security information.

Figure 3:
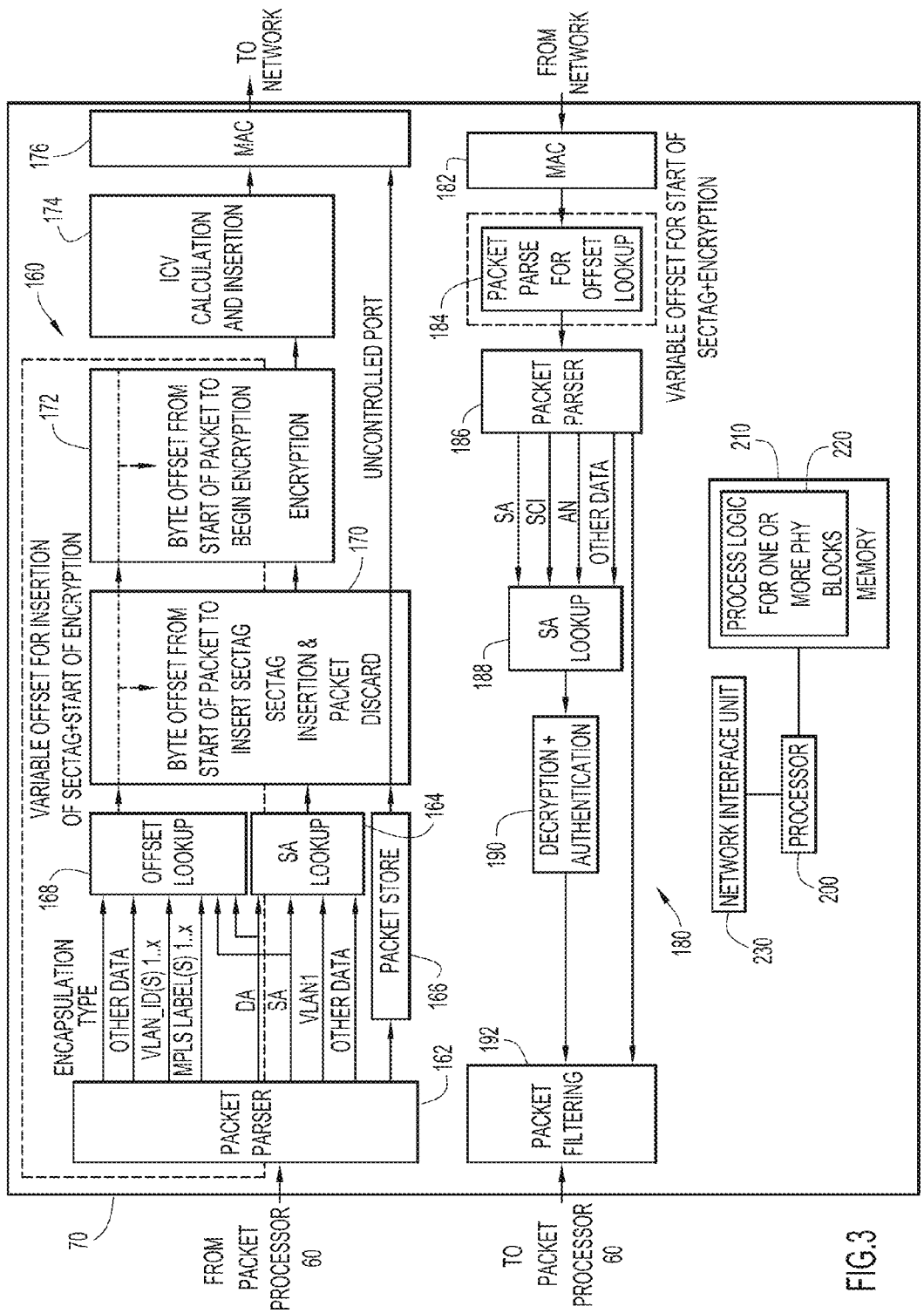
FIG. 3 is a block diagram illustrating an example configuration of a MAC Physical (PHY) processing component in the MACSEC switch-router of FIGS. 1 and 2.

Reference is now made to FIG. 3 which shows an example of the functional blocks of the MAC PHY component 70 configured to perform the techniques described herein. For processing of packets received from an end station to be sent over a service provider network (VLAN, MPLS, PWE3, etc.), there is a first processing subsystem or section called a transmit processing section 160. The transmit processing section 160 comprises a packet parser 162 that receives a packet generated by the packet processor 60 from unsecured data received from an end station. The packet parser 162 outputs the DA, SA, VLAN ID and other data to an SA lookup block 164. In addition, the packet parser 162 outputs the unsecured data to a packet store 166. In addition, an offset lookup block 168 is provided that receives from the packet parser 162 information including the encapsulation type and other data, and one or more VLAN IDs in the case of a VLAN routed packet or one or more MPLS labels in the case of a MPLS routed packet. The offset lookup block 168 also receives the DA and SA from the packet processor and determines a variable offset for insertion of the SecTag+start of encryption information.

There is a SecTag insertion and packet discard block 170 that receives output from the SA lookup block 164 and offset lookup block 168, as well as content in the packet store 166. The SecTag insertion and packet discard block 170 uses the offset information supplied by the offset lookup block to insert the SecTag at a byte offset from the start of packet position. The output of the SecTag insertion and packet discard block 170 is supplied to an encryption block 172. The encryption block uses offset information received from the offset lookup block 168 to encrypt the unsecured data and insert the resulting SecureData in the packet at the appropriate byte offset from start of packet. The packet, built up to this point, is then supplied to the ICV calculation and insertion block 174, which computes and inserts the ICV information after the SecureData in the packet. The MAC block 176 receives the output of the ICV calculation and insertion block 174 and formats the packet appropriately for transmission into the network. The output of the MAC block 176 is either packet 90 shown in FIG. 1 for a VLAN or packet 120 shown in FIG. 2 for a MPLS network, or any of the packet formats described hereinafter in connection with FIGS. 4A, 4B and 4C.

The following generally describes operation of the offset lookup block 168. The offset lookup block 168 receives parsed header information including the DA, SA, any MPLS labels present, any VLAN IDs present, the encapsulation type, and any other data required to calculate the offset. Using optional configurable masks and optional ranges, the data in these fields are used as an input to a lookup table that stores indexes or other links for data in these fields. If a match is found for the data in these fields in the lookup table, the results of the lookup table are used to access an offset memory which returns the offset for the security information (e.g., MACSEC SecTag and encryption) to begin in the packet. If no match is found in the lookup table, the offset will default to the standard MACSEC encryption location and handling. Using this general algorithm, it is possible to provide unique offsets for individual flows within the system. The configurable masks per field and configurable ranges per field allow for smaller lookup tables for a set of flows which can be grouped together. For example, the lookup table may be built with a counter-addressable memory (CAM). The results of the lookup table would be an address to be used for a read operation in a memory that stores offset values. The result of this read operation would provide the packet offset indicating where to begin MACSEC handling.

There is a second processing subsystem called a receive processing section 180 that receives as input a packet, e.g., packet 90 from a VLAN or packet 120 from a MPLS network, and outputs a packet to the packet processor 60. The receive processing section includes a MAC block 182 that operates similar to MAC block 176, in reverse, to recover the various fields of the receives packet. A packet parse for offset lookup block 184 is provided and this block determines the variable offset for start of the SecTag and the SecureData in the received packet. The output of the packet parse for offset lookup block 184 is supplied to a packet parser 186. The packet parser 186 outputs the SA, the Secure Channel Identifier (SCI), Association Number (AN) that identifies up to four different SAs within the context of a Secure Channel and other data. An SA lookup block 188 receives the output of the packet parser 186 and supplies the SecureData and other data to a decryption and authentication block 190. The decryption and authentication block decrypts the SecureData using the SecTag to recover the unsecured data. A packet filtering block 192 receives the unsecured data and other fields obtained by the packet parser 186 for output to the packet processor 60.

Standard implementations of a MAC PHY processor component will assume a fixed offset from the start of the packet, i.e., SA, DA, <SecTag>. By contrast, the MAC PHY processor component 70 is configured to construct packets (and deconstruct packets) with offsets such as:

SA, DA, VLAN[1 . . . x], <SecTag>.
SA, DA, MPLS[1 . . . x], <SecTag>.
SA, DA, OTHER, <SecTag>.
OTHER, <SecTag> (where the lack of SA and DA is meant to indicate a completely non-Ethernet based MACSEC implementation).

Some or all of the blocks shown in FIG. 3 may be implemented in hardware with digital logic or in software. To this end, a processor 200 and a memory 210 are shown as part of the MAC PHY processing component 70, but may also be used to perform the operations of the packet processor 60 (FIG. 1) as well. Stored in memory process logic 220 for one or more PHY blocks of FIG. 3 and optionally for the packet processor 60. Memory 210 may comprise read only memory (ROM), random access memory (RAM), magnetic disk storage media devices, optical storage media devices, flash memory devices, electrical, optical, or other physical/tangible memory storage devices. The processor 200 is, for example, a microprocessor or microcontroller that executes instructions for the process logic 220. Thus, in general, the memory 210 may comprise one or more tangible computer readable storage media (e.g., a memory device) encoded with software comprising computer executable instructions and when the software is executed (by the processor 200) it is operable to perform the operations described herein. A network interface unit 230 is connected to the processor to send packets to and receive packets from the L2 network (VLAN or MPLS). Thus, it is to be understood that the network interface unit 230 will interface packets to be transmitted over the network from the transmit processing section 160 and will receive packets received from the network and supply the received packets to the receive processing section 180. Moreover, when one or more processing functions are implemented by software executed by the processor 210, then network interface unit 230 is configured to interface between the processor 210 and the network.

Figure 4A:
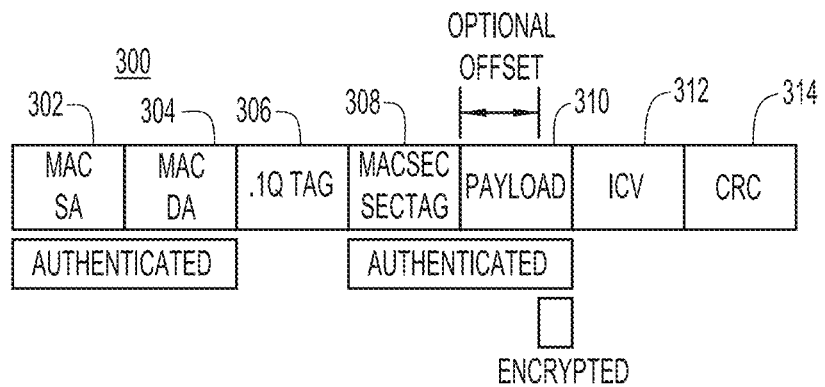
FIGS. 4A, 4B and 4C are diagrams illustrating examples of packet formats that include packet handling information according to the techniques described herein.
Figure 4B:
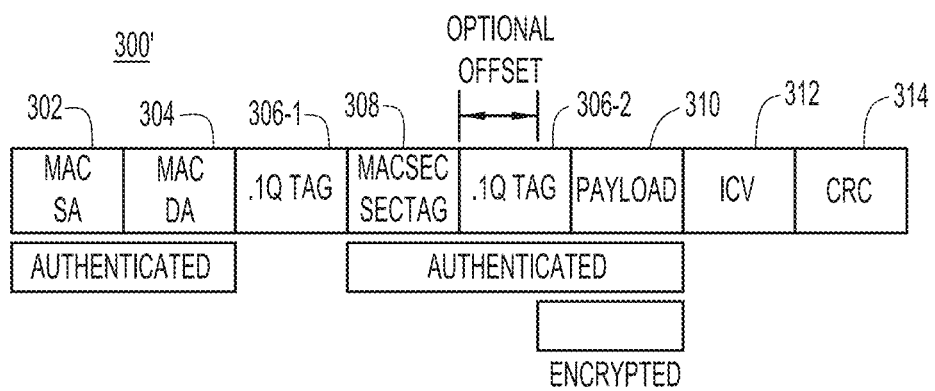
Figure 4C:
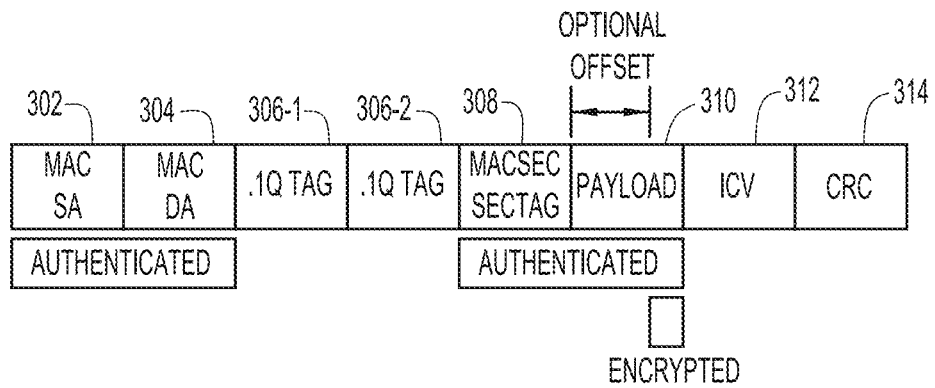

Reference is now made to FIGS. 4A, 4B and 4C for a description of various frame formats that may be generated according to the techniques described herein. FIG. 4A illustrates an example of a frame format that includes a single 802.1q VLAN tag. The fields of frame/packet 300 are a MAC SA 302, MAC DA 304, 802.1q VLAN tag 306, MACSEC SecTag 308 and secured payload 310, ICV 312 and cyclic redundancy code (CRC) 314. Packet 300 comprises authenticated portions that include the MAC SA 302, MAC DA 304, MACSEC SecTag 308 and secured payload 310. Thus, the format of packet 300 is such that the VLAN tag information that contains the packet handling information is "in the clear," that is, not authenticated and not encrypted. Encryption of the payload 310 can begin at an optional offset after the MACSEC SecTag 312.

FIG. 4B shows an example when multiple (e.g., two) VLAN tags are used and one of the VLAN tags is in the clear. Packet 300' comprises the MAC SA 302, MAC DA 304, MACSEC SecTag 308 and secure payload in authenticated portions. The first VLAN tag 306-1 is in the clear before the MACSEC SecTag 308 and the second VLAN tag 306-2 comes after the MACSEC SecTag 308 and is in an authenticated portion. Thus, one of the VLAN tags is in the clear and "vulnerable" but capable of being acted on by the Layer 2 network, whereas another of the VLAN tags is not in the clear, and thus only capable of being acted on by a device (e.g., an enhanced MACSEC VLAN switch-router) that can decrypt the content of the packet to obtain that VLAN tag.

FIG. 4C shows an example of a packet containing multiple VLAN tags, e.g., VLAN tags 306-2 and 306-2, all of which are in the clear and before the MACSEC SecTag 308. Thus, in this example, all of the VLAN tags can be acted on by equipment in the Layer 2 network.

As an example, consider the following handling rules.
1. For DA=00:01:02:03:20:40, SA=don't care, Outer VLAN ID=12, Inner VLAN ID=0.7 insert the SecTag after the Outer VLAN ID (FIG. 4B).
2. For DA=00:01:02:03:20:40, SA=don't care, Outer VLAN ID=12, Inner VLAN ID=8 insert the SecTag after the inner VLAN ID (FIG. 4C).
3. For all else insert MACSEC at the normal location.

The following is an example of an implementation of the offset lookup block 168 that supports a depth of 2 VLANs.
The CAM is programmed with Entry0 as follows:
Exact match on DA=00:01:02:03:20:40
Ignore SA
Outer etype=0x8100
Inner etype=0x8100
Inner VLAN[11:3]=0, Ignore Inner VLAN [2:0]
The CAM is programmed with Entry1 as follows:
Exact match on DA=00:01:02:03:20:40
Ignore SA
Outer etype=0x8100
Inner etype=0x8100
Inner VLAN[11:3]=8
Write address 0 of the offset memory with 4.
Write address 1 of the offset memory with 8.
When the packet with the above fields all match and VLAN=4 is parsed and sent into the CAM, Entry0 provides a hit and returns the fact that a match at Entry0 was found. A read to the offset memory at address 0 returns the value 4. This instructs the SecTag insertion block 170 in FIG. 3 to insert the SecTag 4 bytes after where it normally does (the IEEE 802.1q tag is 4 bytes in length).

When the packet with the above fields all match and VLAN=8 is parsed and sent into the CAM Entry1 provides a hit and returns the fact that a match at Entry1 was found. A read to the offset memory at address 1 returns the value 8. is instructs the SecTag insertion block 170 in FIG. 3 to insert the SecTag 8 bytes after where it normally does (the IEEE 802.1q tag is 4 bytes in length).

When a packet does not match an entry programmed into the CAM a default offset of 0 is returned. A rule could also be built into the CAM to handle this to avoid any unexpected misses. For example, Entry3 of the CAM would ignore all fields, meaning it matches all packets as a catch all.

The offset value could be considered from the start of SA, or from the normal position of SecTag insertion. This is somewhat implementation specific.

This can also be implemented without a CAM or offset memory if the number of "permutations" which need to be handled is small. For example, if it is desired to allow 2 sets of matches only to dictate the offset, a register set and a comparator to configure the registers and masks. The CAM implementation allows it to scale to a larger number of rules.

FIGS. 4A, 4B and 4C are only meant as examples, and these packet formats are applicable to support MPLS labels as well. Moreover, the examples of FIGS. 4B and 4C are applicable to support more than two VLAN tags or MPLS labels in a packet. The payload in the packets shown is not specific and can be any data that is not relevant to the MACSEC, or any other data used for SA lookup. Furthermore, data inserted before the SecTag in the clear and unauthenticated can be relevant information to the far end, or purely data for the intermediate network (VLAN or MPLS) for packet steering. Data used purely for packet steering has little vulnerability because the data is unimportant except for packet handling within the L2 network (for QoS priority-based routing).

FIG. 4B is an example of different packet formats in which a plurality of different packet handling information (generally denoted VLAN1, VLAN2, . . . , VLANx, or MPLS1, MPLS2, . . . , MPLSx) is inserted into the packet to be sent over a VLAN or MPLS network. In one example, all of the plurality of different packet handling information may be inserted in the clear. In another example, some of the plurality of packet handling information is inserted in an authenticated portion of the packet and a remainder of the plurality of packet handling information is in the clear.

Figure 5:
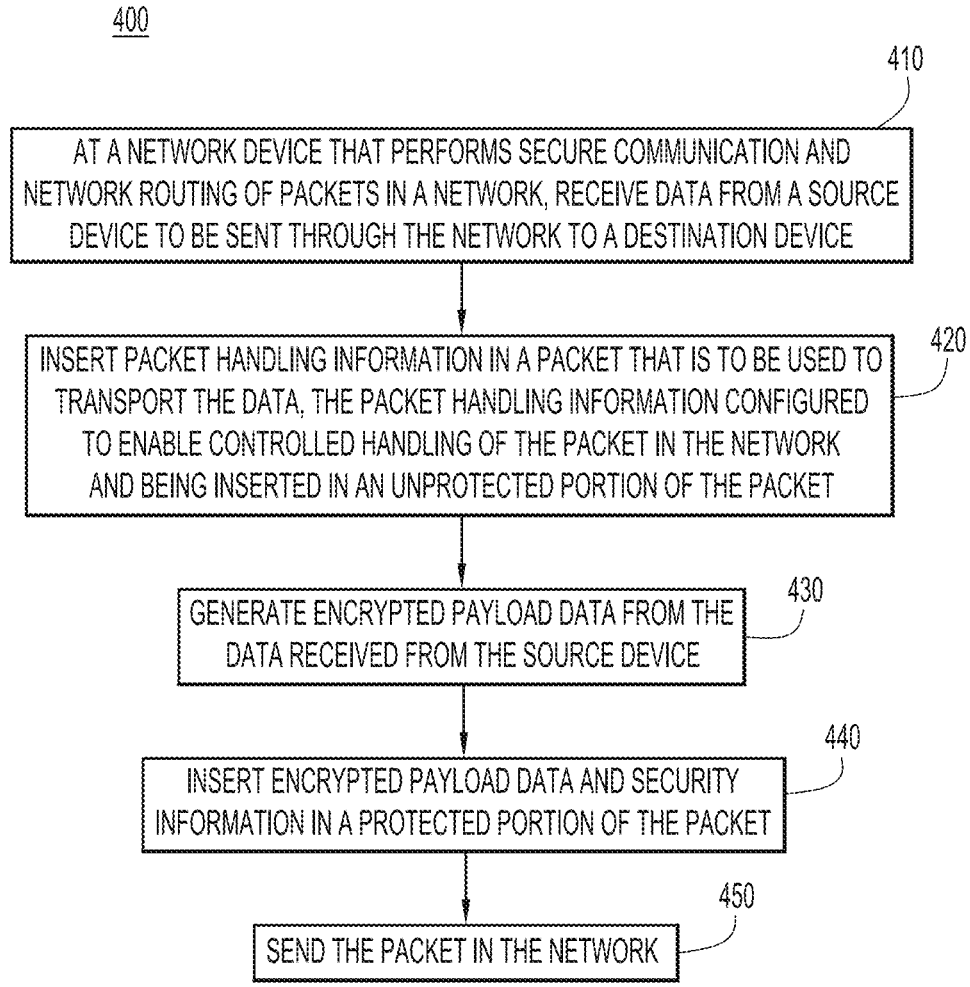
FIG. 5 is a flow chart depicting example operations to generate a packet with packet handling information for transmission over a network.

Reference is now made to FIG. 5 for a description of operations of a method 400 performed for enhanced MACSEC processing to include packet handling information in a packet to be sent into a network. This method 400 is performed by the components (either in hardware or software or a combination thereof) shown in FIG. 3. At 410, at a network device that performs connectionless secure communication and network routing of packets in a network (e.g., device 10), data is received from a source device to be sent through the network to a destination device. At 420, packet handling information is inserted into a packet that is to be used to transport the data. The packet handling information is configured to enable controlled handling of the packet in the network and is inserted in an unprotected (e.g., unauthenticated and unencrypted portion) of the packet (as shown above in connection with FIGS. 4A-4C). Examples of the packet handling information are the PCP fields in the VLAN tags and the Traffic Class field in the MPLS tags described above. The packet handling information enables controlled handling in the network, such as packet steering, priority-based routing for different levels of QoS, billing indications/reports, etc. At 430, encrypted payload data is generated from the data received from the source device. For example, as described herein, the generation of the encrypted payload is performed using techniques according to the MACSEC security standard of IEEE 802.1AE, and the security information is a MACSEC security tag. At 440, the encrypted payload data and security information are inserted in a protected portion (e.g., authenticated portion) of the packet. The determination of the locations/positions for inserting the payload data and security information (e.g., MACSEC SecTag) is described above in connection with FIGS. 4A, 4B and 4C. At 450, the packet so generated is sent into the L2 network. The equipment in the L2 network can examine the packet handling information, labels and tags, which are in the clear in the packet, to perform packet handling, e.g., packet steering, priority-based routing, billing reports, etc., in the network without having access to the payload (since it is encrypted) and without any special configuration or knowledge of a particular location of the packet handling information since it will be in a location of the packet where the equipment is already configured to look for and act on such information.

Figure 6:
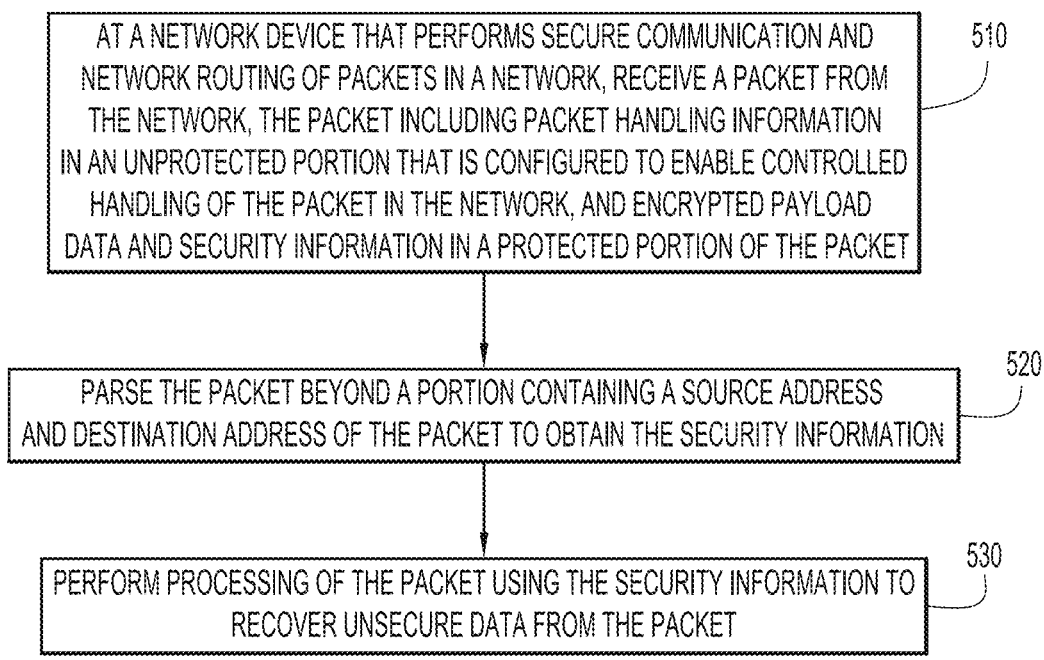
FIG. 6 is a flow chart depicting example operations to process a received packet over a network and recover the security information in the packet.

FIG. 6 is a flow chart that depicts examples of operations of a method 500 that is performed when a packet formatted according to the techniques described herein is received by an enhanced MACSEC VLAN switch-router 10. At 510, at a network device that performs connectionless secure communication and network routing of packets in a network, a packet is received from the network, the packet including packet handling information in an unprotected portion, and which packet handling information is configured to enable controlled handling of the packet in the network. The packet further contains encrypted payload data and security information in a protected portion (e.g., authenticated portion) of the packet. At 520, the packet is parsed beyond a portion containing a source address and destination address of the packet to obtain the security information (and the encrypted payload data). At 530, processing of the packet is performed using the security information to decrypt the encrypted payload data and recover the unsecured data sent by a source device.

In summary, the techniques described herein involve appending packet handling information (e.g., one or more VLAN tags or MPLS labels) in the clear ahead of (or after) security related information in a packet to be routed over a L2 network to optimize wide area network deployments of security-configured (e.g., connectionless security such as MACSEC) equipment. Packet handling is achieved through a provider network while the customer data is encrypted and the network provider equipment can remain totally unchanged but still act on the packet handling information. In so doing, the operations that are normally performed by two separate boxes (devices) can be collapsed into a single box and packet handling information can be acted on by a network unaware of the fact that the packet is sent with security. The same piece of equipment that performs the encryption, e.g., MACSEC, also inserts the packet handling information to facilitate the packet handling. This results in cost savings for our customers while also improving packet handling.

These techniques can also be performed by customer bridge equipment that has access to the customer traffic before it is encrypted and can therefore set values for the packet handling information. Again, the packet formats leaving the equipment are equivalent to how a downstream box would have encapsulated the packets before transport. Therefore, the intermediate network devices do not need to be aware of any special packet formatting, etc. The intermediate network nodes treat the packets as if they were unencrypted, but the sensitive customer data is not exposed to the intermediate network nodes. By adding intelligence to the device performing the security functions to allow it to parse down passed clear text (with masks) to insert/remove the SecTag and encrypt/decrypt data, it is possible for the network provider to treat encrypted traffic differently, without having to make any of equipment in the provider network security-aware.

While the foregoing makes reference to the use of a single integrated enhanced MACSEC/VLAN or MACSEC/MPLS switch-router, there may be cases where having an enhanced device on both ends of the deployment is required depending on how the service provider equipment and customer edge equipment are deployed/owned/operated. In this case, the first piece of equipment in the service provider network (e.g., in network 20 shown in FIG. 1) would do a VLAN translation from a VLAN ID to a service provider desired VID in order to steer the packet.

The above description is intended by way of example only.

What is claimed is:

1. A method executed at a single network device, comprising:
    receiving, at the single network device, unsecured data sent from a source device towards a destination device;
    generating, at the single network device, packet handling information comprising at least one of a virtual local area network (VLAN) tag or a Multiprotocol Label Switching (MPLS) label from a portion of the unsecured data received from the source device, and wherein the packet handling information includes routing priority information determined based on the unsecured data;
    generating, at the single network device, encrypted payload data from the unsecured data using techniques according to the Media Access Control Security (MACSEC) standard of IEEE 802.1 AE;
    generating, at the single network device, a MACSEC security tag;
    generating, at the single network device, a packet that transports the encrypted payload data towards the destination device;
    inserting, at the single network device, the encrypted payload data in an encrypted and authenticated portion of the packet that transports the encrypted payload data towards the destination device;
    inserting, at the single network device, the packet handling information into an unencrypted and unauthenticated portion of the packet;
    determining, based on one or more of a source address, a destination address, an encapsulation type, and the at least one of the VLAN tag or the MPLS label, a variable byte offset from a start of the packet for insertion of the MACSEC security tag;
    at the single network device, using the variable byte offset from the start of the packet to determine a selected location for insertion of the MACSEC security tag in the packet, wherein the selected location is after the at least one of the VLAN tag or the MPLS label;
    inserting the MACSEC security tag at the selected location of the packet; and
    sending, at the single network device, the packet on a network.

2. The method of claim 1, wherein a configurable mask is used to determine the variable byte offset.

3. The method of claim 1, further comprising:
    generating Integrity Check Value (ICV) information; and inserting the ICV information in the packet.

4. The method of claim 1, wherein the packet handling information includes information describing a level of service to be used for the unsecured data.

5. The method of claim 1, wherein sending comprises sending the packet on a network that employs emulation of a Layer 2 point-to-point connection-oriented service over a packet-switching network.

6. The method of claim 1, further comprising:
    determining an offset from an end of the MACSEC security tag at which to begin encryption of the payload data.

7. The method claim 1, wherein the at least one of the VLAN tag or the MPLS label comprises a VLAN tag having a value added into a Priority Code Point field of the VLAN tag, the value indicating a priority level of the packet.

8. The method of claim 1, wherein the packet handling information further comprises Quality of Service (QoS) information.

9. The method of claim 1, wherein the packet handling information comprises a plurality of different pieces of packet handling information in the packet.

10. The method of claim 9, wherein at least one of the plurality of pieces of packet handling information is located in an authenticated portion of the packet.

11. A single network device, comprising:
    one or more network interfaces configured to receive unsecured data sent from a source device towards a destination device;
    at least one memory; and
    one or more processors configured to:
    generate packet handling information comprising at least one of a virtual local area network (VLAN) tag or a Multiprotocol Label Switching (MPLS) label from a portion of the unsecured data received from the source device, and wherein the packet handling information includes routing priority information determined based on the unsecured data,
    generate encrypted payload data from the unsecured data using techniques according to the Media Access Control Security (MACSEC) standard of IEEE 802.1 AE,
    generate a MACSEC security tag,
    generate a packet that transports the encrypted payload data towards the destination device,
    insert the encrypted payload data in an encrypted and authenticated portion of the packet that transports the encrypted payload data towards the destination device,
    insert the packet handling information into an unencrypted and unauthenticated portion of the packet;
    determining a variable byte offset from a start of the packet for insertion of the MACSEC security tag based on one or more of a source address, a destination address, an encapsulation type, and the at least one of the VLAN tag or the MPLS label;
    use the variable byte offset from the start of the packet to determine a selected location for insertion of the MACSEC security tag in the packet, wherein the selected location is after the at least one of the VLAN tag or the MPLS label;
    insert the MACSEC security tag at the selected location of the packet, and
    send the packet on a network via at least one of the one or more network interfaces.

12. The single network device of claim 11, wherein the processor is configured to use a configurable mask to determine the variable byte offset.

13. The single network device of claim 11, wherein the processor is configured to:

generate Integrity Check Value (ICV) information; and
insert the ICV information in the packet.

14. The single network device of claim 11, wherein the packet handling information includes information describing a level of service to be used for the unsecured data.

15. The single network device of claim 11, wherein the processor is configured to send the packet on a network that employs emulation of a Layer 2 point-to-point connection-oriented service over a packet-switching network.

16. The single network device of claim 11, wherein the processor is configured to:
  determine an offset from an end of the MACSEC security tag at which to begin encryption of the payload data.

17. The single network device of claim 11, wherein the at least one of the VLAN tag or the MPLS label comprises a VLAN tag having a value added into a Priority Code Point field of the VLAN tag indicating a priority level of the packet.

18. The single network device of claim 11, wherein the packet handling information further comprises Quality of Service (QoS) information.

19. The single network device of claim 11, wherein the packet handling information comprises a plurality of different pieces of packet handling information.

20. The single network device of claim 19, wherein at least one of the plurality of pieces of packet handling information is located in an authenticated portion of the packet.

* * * * *